April 12, 1938. A. CLAUD-MANTLE 2,114,059
BRACKET FOR AUTOMOBILE ROBE RAILS, DOOR HANDLES, GRIP CORDS, OR THE LIKE
Filed March 22, 1937
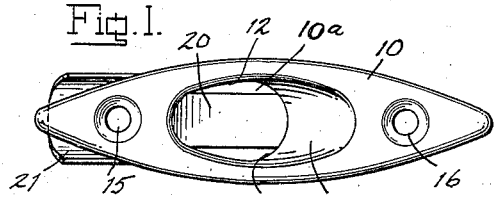
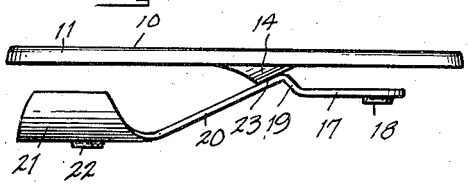
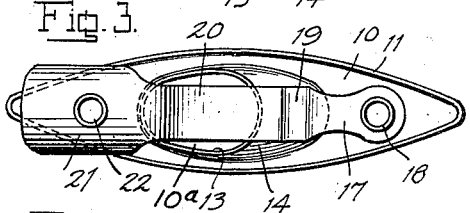
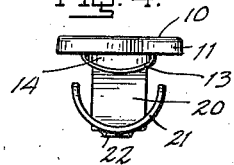
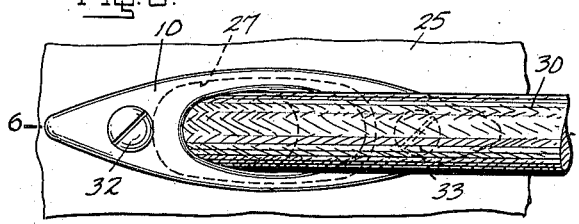
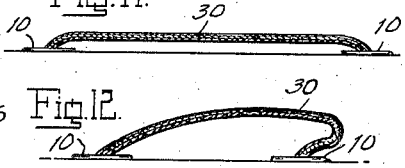
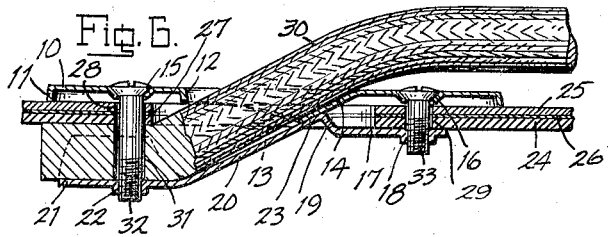
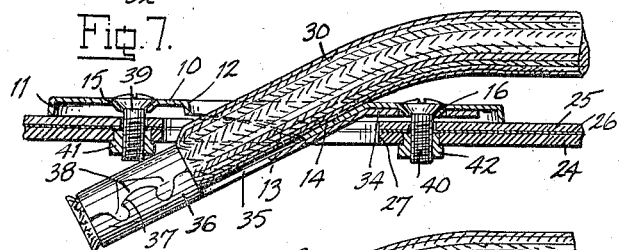
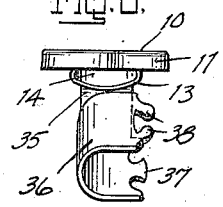
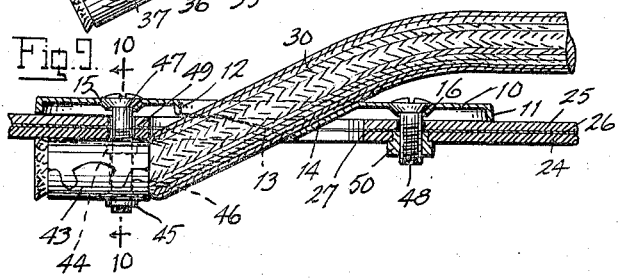
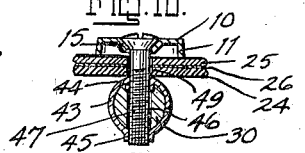
INVENTOR
ARTHUR CLAUD-MANTLE.
BY
ATTORNEY Patented Apr. 12, 1938

2,114,059

UNITED STATES PATENT OFFICE 2,114,059

BRACKET FOR AUTOMOBILE ROBE RAILS, DOOR HANDLES, GRIP CORDS, OR THE LIKE

Arthur Claud-Mantle, Trumbull, Conn., assignor to The Bassick Company, Bridgeport, Conn., a corporation of Connecticut Application March 22, 1937, Serial No. 132,433

6 Claims. (Cl. 24—123)

The present invention relates to an improved bracket for automobile robe rail, door handle, grip cord, or the like, and has for an object to provide such brackets which may be attached to the automobile structure with facility, with the cord securely held thereby, so that strains imposed thereon will be transmitted to the bracket and the automobile structure, without likelihood of distortion or breakage of the parts. Another object is to provide a bracket which will have its outer exposed side substantially flush with the automobile structure, so that there will be no projecting parts against which the occupant of the car may be injured, the cord extending out from the bracket in such manner as to provide a cushion over the exposed bracket surface, so that in the event that the occupant of the car is forcibly thrown against the bracket the blow will be cushioned by contact with the cord.

A further object is to provide a structure in which the bracket may be fastened to the automobile structure simply by the insertion of screws through holes provided in the automobile structure, and to this end I propose to provide means engaged both interiorly and exteriorly of the automobile structure and which are clamped in relation to the automobile structure by screws.

A further object is to provide a bracket structure in which the cord may be attached simply by the insertion of the attaching screw which secures the bracket in place.

With the above and other objects in view embodiments of the invention are shown in the accompanying drawing, and these embodiments will be hereinafter more fully described with reference thereto and the invention will be finally pointed out in the claims.

In the drawing:

Fig. 1 is a front elevation of a bracket, according to one exemplary embodiment of the invention.

Fig. 2 is a side elevation thereof.

Fig. 3 is a rear elevation thereof.

Fig. 4 is an end elevation taken from the left hand side as shown in Fig. 1.

Fig. 5 is a front elevation showing the bracket secured in place on the automobile structure and with the cord in place.

Fig. 6 is a longitudinal sectional view taken along the line 6—6 of Fig. 5.

Fig. 7 is a longitudinal sectional view of a modified form of the invention.

Fig. 8 is an end view of the bracket as shown in Fig. 7, before attachment of the same to the cord and to the automobile structure.

Fig. 9 is a longitudinal sectional view of a further modified form of the invention.

Fig. 10 is a transverse sectional view taken along the line 10—10 of Fig. 9.

Fig. 11 is a plan view showing, in reduced scale, the use of the brackets according to the invention for an automobile robe rail.

Fig. 12 is a plan view showing in reduced scale, the use of the brackets according to the invention for a pull-to door handle.

Fig. 13 is a side view showing in reduced scale, the use of the bracket according to the invention for a grip cord.

Similar reference characters indicate corresponding parts throughout the several figures of the drawing.

Referring to the drawing, and more particularly to Figs. 1 to 6 thereof, the exemplary illustrated embodiment of the invention shown therein consists of an escutcheon plate member 10 having a rim flange 11, and provided with an opening 10ª of substantially oval form, and diagonally arranged, the upper end 12 of the opening lying in the upper plane of the plate 10 and extending symmetrically at each side of the center, and the lower end 13 of the opening being disposed rearwardly of the upper surface of the plate 10 in a substantially diagonal plane and being connected to the upper end 12 of the opening by a flange 14 which at one side is of reduced height and forms a rim for one end of the opening and at its other end extends in a diagonal direction and is of concave form and forms a supporting surface for the cord, which is extended through the opening, as will presently more fully appear. In the ends of the plate 10 there are provided countersunk screw holes 15 and 16.

An attaching and cord clamping member is secured to the inner side of the plate 10, and consists of a portion 17 disposed in spaced and parallel relation to one end of the plate 10, and having a flanged and threaded screw receiving hole 18 aligned with the countersunk screw hole 16, a forwardly bent connecting portion 19 connecting the portion 17 to a rearwardly extending diagonal portion 20 which is adapted to extend inwardly from the plate 10 in substantial continuation to the flange surface 14, and a substantially semi-cylindrical cord clamping portion 21 at the lower end of the portion 20, this portion 21 being disposed in spaced and parallel relation to the plate 10 and having a flanged threaded screw receiving hole 22 in alignment with the countersunk hole 15. The attaching and cord clamping member is permanently secured to the plate member 10 by spot-welding the portion 20 to the under side of the flange portion 14, as at 23.

The automobile structure to which the bracket is to be attached and which may be a seat back in the case of a robe rail, a door in the case of the pull-to handle, or a side wall in the case of a grip cord, consists of sheet steel 24 having at its outer side a covering of upholstery material 25, a card-board layer 26 being disposed between the steel and the upholstery layer. In order to receive the bracket the automobile structure is provided with a slot opening 27, and in spaced relation to each end thereof are provided screw receiving holes 28 and 29.

The size and arrangement of the slot opening 27 is such that the bracket may first have the cord clamping end 21 engaged therethrough to a point where the end portion 17 may be engaged therethrough, whereupon the bracket is shifted to bring the hole 18 of the portion 17 into alignment with the hole 29 of the automobile structure, the hole 22 of the portion 21 being at the same time brought into alignment with the hole 28. It will be seen that in this relation the escutcheon plate and the portions 17 and 21 are disposed about the automobile structure at each end of the slot opening 27 in the form of clamps.

The cord 30 is provided near its end with a screw receiving hole 31, and upon engagement of the cord with the bracket through the openings 12 and 13 the end is disposed between the automobile structure and the clamping portion 21 with the hole 31 in alignment with the threaded hole 22, the hole 28 of the automobile structure and the countersunk hole 15 of the escutcheon plate. Thereupon the bracket and the cord are secured in place by means of screws 32 and 33, the screw 32 being engaged through the countersunk hole 15, the automobile structure hole 28, the cord hole 31, and the threaded hole 22 of the clamping portion 21, and upon tightening clamps the escutcheon plate and the portion 21 with respect to the automobile body and compresses and clamps the end of the cord between the clamping portion 21 and the automobile body so that the cord is thus securely held. The screw 33 is engaged through the countersunk hole 16, the automobile structure hole 29, and the threaded hole 18 of the portion 17, tightening of this screw causing the escutcheon plate and the portion 17 to be tightly clamped about the automobile structure.

In Figs. 7 and 8 I have illustrated a modified form of the invention in which the same escutcheon plate is used as in the first embodiment. The cord attaching member consists of an apertured portion 34, secured by spot-welding to the under side of the escutcheon plate in surrounding relation to the countersunk hole 16, an inclined connecting portion 35 extending at the inner side of the flange portion 14 in substantial continuation thereof, and provided upon its inner end with a clamping extension 36 having interlocking edge portions 37 and 38, which when the extension 36 is bent into tubular form interlock to form a tubular clamp.

The end of the cord 30 is securely clamped by the portions 35 and 36 and is thus permanently secured to the bracket. The cord may if desired be conveniently secured to the bracket as the same is being installed in the automobile simply by providing the workman with a clamping plier for clamping the extensions 35 and 36 about the cord. The bracket is attached to the automobile by means of screws 39 and 40 engaged in the countersunk holes 15 and 16 and screwed into clinch nuts 41 and 42 riveted to the automobile body structure.

In Fig. 9 I have illustrated a further modification in which the clamping member is dispensed with, and instead the cord 30 has secured upon its end a cylindrical end or ferrule member 43, having threaded and flanged apertures 44 and 45, the cord also having a passage 46 aligned with these apertures. In this case the escutcheon plate is secured by screws 47 and 48, the screw 47 being engaged through the countersunk hole 15, an aperture 49 in the automobile structure and through the threaded apertures 44 and 45 and the passage 46 of the cord, and the screw 48 being engaged through the countersunk hole 16, and a clinch nut 50 riveted to the automobile structure.

The bracket according to the invention provides a secure attachment for the cord which will effectually take strains opposed upon it. At the same time the outer structure of the bracket is substantially flush with the automobile body structure, so that there are no metal projections against which a person might be injured, the projecting cord preventing contact with the metal parts in the event that a person is thrown against the bracket.

In Figs. 11, 12 and 13 I have shown various manners in which the bracket may be used, Fig. 11 showing two brackets oppositely arranged and having the ends of the robe rail cord secured thereto, Fig. 12 showing a door handle in which the brackets are in the same arrangement with the ends of the cord connected as a loop, and Fig. 13 showing one bracket arranged vertically and supporting a grip cord.

I have illustrated and described preferred and satisfactory embodiments of the invention, but it will be obvious that changes may be made therein, within the spirit and scope thereof, as defined in the appended claims.

Having thus described my invention, what I claim and desire to secure by Letters Patent is:—

1. A bracket for an automobile robe rail cord or the like for attachment to an automobile body structure or the like having an opening therein, an escutcheon plate member having an outer surface substantially parallel to said body structure surface and having an inner surface adapted to be engaged at the outer side of said body structure, and said escutcheon plate having an aperture the outer edge of which is within the outline of said body structure opening and susbtantially parallel to said body structure surface to receive the cord extended through said aperture to the interior of said body structure, clamping means arranged to secure the end of said cord interiorly of said body structure, and attaching means for securing said plate and clamping means rigidly to said body structure.

2. A bracket for an automobile robe rail or the like for attachment to an automobile body structure or the like having an opening therein, an escutcheon plate member having an outer surface substantially parallel to said body structure surface and having an inwardly extending rim flange adapted to be engaged with the outer side of said body structure, and said escutcheon plate having an apertured recessed portion which extends into said body structure opening to receive said cord extended through said apertured recessed portion to the interior of said body structure, clamping means arranged to secure the end of said cord interiorly of said body structure, and attaching means for securing said plate and clamping means rigidly to said body structure.

3. A bracket for an automobile robe rail cord or the like for attachment to an automobile body structure or the like having an opening therein, an escutcheon plate member having an inner surface for engagement with the outer side of said body structure in surrounding relation to said opening and having an aperture within the outline of said body structure opening to receive said cord extended through said aperture to the interior of said body structure, clamping means arranged interiorly of said body structure to secure the end of said cord, and an attaching screw engaged through said plate extending to the inner side of said body structure to secure said plate thereto, said clamping means having a threaded opening to be engaged by said screw whereby said body structure is clamped between said plate and said clamping means.

4. The invention as defined in claim 3 further characterized in that said cord has a passage therethrough engaged by said screw whereby said cord is clamped between said clamping means and said body structure.

5. A bracket for an automobile robe rail cord or the like for attachment to an automobile body structure or the like having an opening therein, an escutcheon plate member having an inner surface for engagement with the outer side of said body structure in surrounding relation to said body structure opening and having an aperture within the outline of said body structure opening to receive said cord extended through said aperture to the interior of said body structure, clamping means arranged interiorly of said body structure to secure the end of said cord at one side of said aperture, means securing said clamping means to said plate member at the other side of said aperture.

6. A bracket for an automobile robe rail cord or the like for attachment to an automobile body structure or the like having an opening therein, an escutcheon plate member having an outer surface substantially parallel to said body structure surface and having an inner surface adapted to be engaged at the outer side of said body structure, and said escutcheon plate having an aperture the outer edge of which is within the outline of said body structure opening and substantially parallel to said body structure surface to receive the cord extended through said aperture to the interior of said body structure, means arranged to secure the end of said cord interiorly of said body structure, and attaching means for securing said plate rigidly to said body structure.

ARTHUR CLAUD-MANTLE.